(No Model.)
A. C. HOPE.
ELEVATOR SAFETY CATCH.
No. 283,110. Patented Aug. 14, 1883.
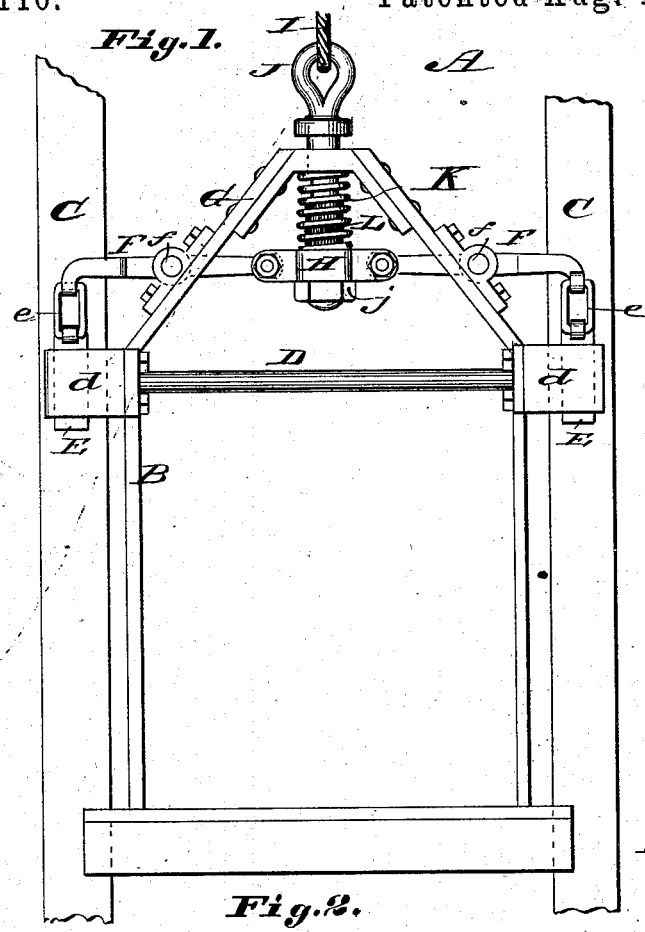
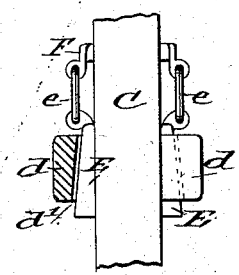
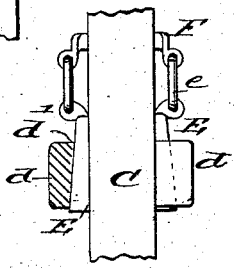
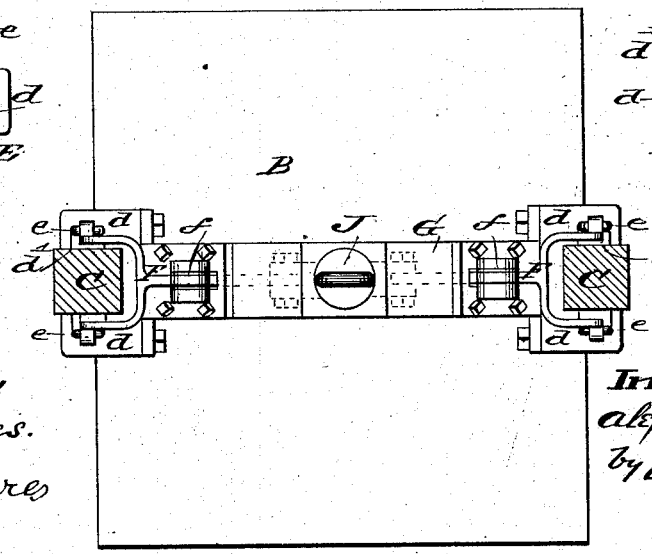
Attest:
T. L. Jones.
S. S. Mares
Inventor,
Alexander C. Hope
by C. D. Moody
atty

UNITED STATES PATENT OFFICE.

ALEXANDER C. HOPE, OF CARTERVILLE, ILLINOIS.

ELEVATOR SAFETY-CATCH.

SPECIFICATION forming part of Letters Patent No. 283,110, dated August 14, 1883.

Application filed April 20, 1883. (No model.)

*To all whom it may concern:*

Be it known that I, ALEXANDER C. HOPE, of Carterville, Williamson county, Illinois, have made a new and useful Improvement in Elevator Safety-Catches, of which the following is a full, clear, and exact description, reference being had to the annexed drawings, making part of this specification, in which—

Figure 1 is a side elevation of the improved catch; Fig. 2, a plan; and Figs. 3 and 4, details, being sectional elevations illustrating the wedging action of the catch, the elevations being taken at right angles to that of Fig. 1, and showing, respectively, the two positions of the wedges.

The same letters denote the same parts.

This invention relates to the mode of wedging the cross-head of the elevator-cage to the slides.

A represents an elevator having the improvement. Aside from the improvement the elevator may be of any of the customary forms.

B represents the cage or platform.

C C represent the uprights or slides which serve to guide the movement of the cage or platform.

D represents the cross-head of the cage. Its jaws $d\ d$ have tapering recesses $d'\ d'$ to receive the wedges E E. These wedges, by means of the links $e\ e$, are connected with the levers F F, which in turn are pivoted at $f\ f$ in the yoke G, and whose inner ends are united by means of the link H.

The rope I, for elevating the cage or platform, is attached to the bolt J, which is adapted to work upward and downward in the yoke G and link H. The bolt is provided with a nut, head, or shoulder, $j$, which, when the cage or platform is being sustained by the rope I, comes against the link H, causing the link to be lifted.

A spiral spring, K, surrounds the bolt J, between the link H and yoke G. The upward movement of the link is transmitted through the spring to the yoke, and as the yoke is attached to the cage or platform the latter is sustained through the instrumentality of the spring. The lifting of the link H causes the outer ends of the levers F F, and with them the wedges E E, to drop; and when thus depressed, as shown in Fig. 3, the jaws $d\ d$ are free to move upon the slides C C. But whenever the upward strain upon the link H is released (as when the rope I parts) the spring K acts promptly to depress the link H. This, in turn, causes the wedges E E to be drawn upward, as shown in Fig. 4, and when thus drawn upward they act to wedge the jaws $d\ d$ to the slides C C and prevent the cage from dropping. An inner spring, L, may also be used to aid in preventing injury from suddenly lifting the elevator cage or platform. The spring K, however, is of itself useful for this purpose.

I claim—

The combination of the slides C C, the cross-head D, the wedges E E, the levers F F, the yoke G, the link H, the rope I, the bolt J, and the spring K, substantially as described.

Witness my hand this 22d day of March, 1883.

ALEXANDER C. HOPE.

Witnesses:
C. D. MOODY,
CHARLES PICKLES.